United States Patent
Fahrbach et al.

[11] Patent Number: 5,982,280
[45] Date of Patent: Nov. 9, 1999

[54] MONITORING A CLUTCH

[75] Inventors: Wilhelm Fahrbach, Bietigheim; Thomas Rueping, Lenningen; Marcel Hachmeister, Korntal-Mün chingen; Ralf Klewin, Stuttgart, all of Germany

[73] Assignee: Robert Bosch GmbH, Stuttgart, Germany

[21] Appl. No.: 09/052,069

[22] Filed: Apr. 6, 1998

Related U.S. Application Data

[63] Continuation of application No. 08/767,066, Dec. 16, 1996, abandoned.

[30] Foreign Application Priority Data

| Dec. 30, 1995 | [DE] | Germany | 195 49 171 |
| Mar. 27, 1996 | [DE] | Germany | 196 12 146 |
| Jul. 16, 1996 | [DE] | Germany | 196 28 584 |

[51] Int. Cl.⁶ .................................................. B60Q 1/00
[52] U.S. Cl. ..................................... 340/453; 340/454
[58] Field of Search .................................. 340/453, 454, 340/456; 192/3.31, 3.3, 30 R; 180/278; 477/39, 62, 64, 70, 159

[56] References Cited

U.S. PATENT DOCUMENTS

| 4,351,205 | 9/1982 | Fischer | 192/3.28 |
| 4,499,450 | 2/1985 | Makita | 340/453 |
| 4,651,142 | 3/1987 | Klatt | 340/453 |
| 4,744,269 | 5/1988 | Greene et al. | 192/3.3 |
| 4,817,473 | 4/1989 | Baltusis et al. | 192/3.3 |
| 5,190,130 | 3/1993 | Thomas et al. | 192/3.31 |
| 5,571,060 | 11/1996 | Becker et al. | 477/159 |

FOREIGN PATENT DOCUMENTS

| 3624008 | 1/1988 | Germany . |
| 4304596 | 8/1994 | Germany . |
| 2223076 | 3/1990 | United Kingdom . |

OTHER PUBLICATIONS

"Kraftfahrtechnisches Handbuch" published Aug. 21, 1991, pp. 539 to 541.

*Primary Examiner*—Thomas Mullen
*Assistant Examiner*—Van T. Trieu
*Attorney, Agent, or Firm*—Walter Ottesen

[57] ABSTRACT

The invention relates to a system for monitoring a clutch between a motor of a vehicle and a transmission thereof with respect to impermissible slip. For this purpose, the monitoring system provides that a value is determined with the presence of specific operating conditions. This value represents the slip present at the clutch. This value can then be compared to at least one pregiven first threshold value. With the system of the invention, the clutch is monitored with respect to clutch wear which has already occurred. In one configuration of the invention, the clutch is configured as a converter bridging clutch and is generally configured with an automatic transmission; whereas, in another configuration of the invention, a clutch is considered which can interrupt the frictional connection between the motor of the vehicle and the transmission when the clutch is completely disengaged.

11 Claims, 4 Drawing Sheets

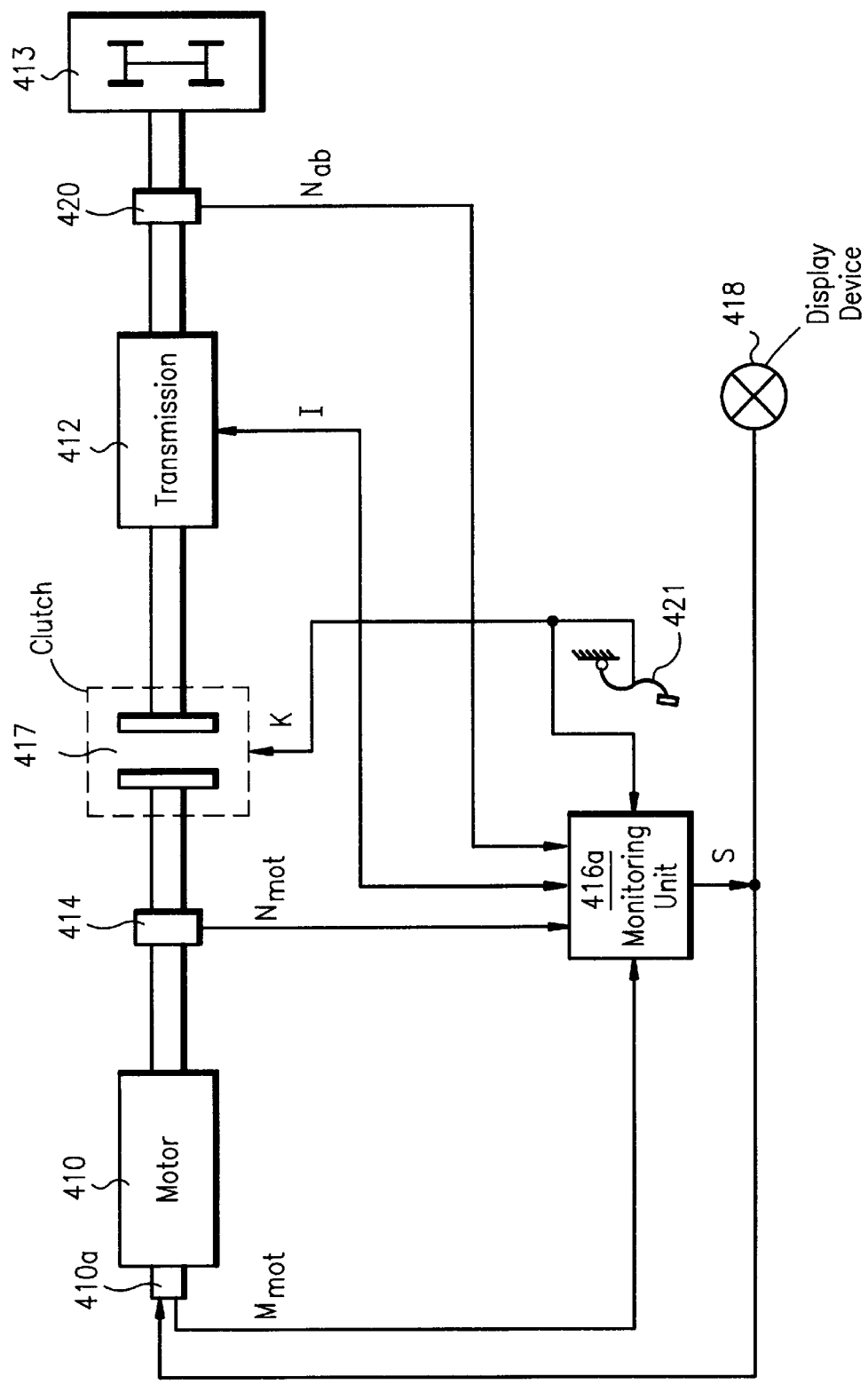

MONITORING A CLUTCH

This is a continuation of application Ser. No. 08/767,066, filed on Dec. 16, 1996, now abandoned.

BACKGROUND OF THE INVENTION

It is known to provide converters for converting torque. These converters can be bridged by a clutch as disclosed, for example, in the "Kraftfahrtechnische Handbuch", 21st Edition, 1991, pages 539 to 541. It is furthermore known to utilize clutches between the vehicle motor and the transmission to interrupt the frictional connection between the motor and the transmission.

Furthermore, it is known from German patent publication 4,304,596 (corresponding to U.S. patent application Ser. No. 08/197,203, filed Feb. 16, 1994, now abandoned) to drive the converter clutch to adjust a desired converter slip.

U.S. Pat. No. 4,651,142 and British patent publication 2,223,076 disclose arrangements wherein the clutch is monitored to provide protection against overheating. In the subject matter of German patent publication 3,624,008, the energy taken up by the clutch during operation thereof is determined by detecting the slip. During a clutch operation, a warning signal is generated when the energy absorbed by the clutch and determined in the manner described above, exceeds a pregiven value.

SUMMARY OF THE INVENTION

It is an object of the invention to provide a system for monitoring the operation of a clutch.

The system of the invention is for monitoring a clutch with respect to impermissible slip with the clutch being arranged between a motor of a vehicle and the transmission thereof. The system includes: sensor means for determining operating variables associated with at least one of the motor, the clutch, and the transmission; a monitoring device operatively connected to the sensor means; the monitoring device including: value forming means for forming a value from the operating variables representing the slip present in the clutch; and, comparison means for comparing the value to a pregiven first threshold value when specific operating conditions are present.

As mentioned above, the invention relates to a system for monitoring a clutch with respect to impermissible slip. The clutch is mounted between the vehicle motor and a transmission. Monitoring means are provided for this purpose which determine a value when specific operating conditions are present. This value represents the slip present at the clutch. For monitoring, this value is compared to at least one pregiven first threshold value.

With the system according to the invention, the clutch is monitored with respect to clutch wear which has already occurred.

In one embodiment of the invention, the clutch is configured as a converter bridging clutch, usually in combination with an automatic transmission (that is, a clutch which bridges a converter); whereas, in another embodiment of the invention, a clutch is provided which can completely interrupt the frictional connection between the motor of the vehicle and the transmission by disengaging completely.

In the one advantageous embodiment of the invention, it is therefore provided that, between the motor of the vehicle and the transmission, a converter is installed which can be bridged by a converter bridging clutch. Here, the clutch which is monitored is the converter bridging clutch.

The converter bridging clutch functions to bridge a torque converter. A defect in the converter bridging clutch can lead to a deterioration of the driving characteristics and of the exhaust-gas performance of the motor vehicle. For this reason, it is necessary to monitor the converter bridging clutch. A monitoring of this kind is especially advantageous with respect to an impermissibly high converter slip. Such a defect can, for example, be caused by a defective converter clutch actuator or by defective friction linings of the converter clutch.

In this configuration, the invention permits detecting a fault for a converter bridging clutch wherein the drive thereof controls to a desired slip as well as for a converter clutch which only bridges the converter or enables the same. It is not necessary to distinguish between these types of clutches. Furthermore, the invention is independent of whether the drive of the converter clutch is analog, clocked or digital (converter clutch engaged/disengaged).

An advantageous embodiment of the invention relates also to a converter clutch, which is controlled as mentioned above, wherein means are provided by which the converter clutch can be driven to adjust a desired slip. The specific operating conditions for which monitoring takes place, according to the invention, are present when the converter clutch is driven to adjust a slight slip. In this way, a defect can also be detected on the converter clutch wherein the converter clutch is still correctly completely engaged but the converter clutch permits an impermissibly high slip in the transition region to the disengaged state.

For a converter clutch which completely bridges or enables the converter, the specific conditions wherein monitoring takes place in accordance with the invention are present when the converter clutch is driven for completely engaging the clutch.

Furthermore, the specific operating conditions wherein the monitoring takes place in accordance with the invention are then present when the output torque of the motor of the vehicle drops below a pregiven second threshold value. Because the converter slip is dependent upon its input torque (motor torque), this embodiment achieves the situation that the converter slip is relatively low for a correctly functioning clutch. This embodiment considers that, even for a correctly operating converter clutch, at very high motor torques a certain slip can occur.

It is especially provided that the presence of specific operating conditions (during which monitoring according to the invention takes place) is made dependent upon the above-mentioned setting of a low slip and the above-mentioned low motor torque.

Advantageously, specific measures are initiated in dependence upon the result of the comparison. For example, to initiate such measures, driving a fault display and/or opening a converter clutch is triggered. For example, the clutch, operating with a defect, can be indicated to the driver of the vehicle or to the persons at the maintenance facility via the fault display. It can be provided that the result of the comparison achieved with the invention is first filtered and only then the measures are introduced in dependence upon the filtered comparison result. With such a filtering (for example, via an integration member), it is ensured that short-term fluctuations of the converter slip or clutch slip do not immediately lead to the initiation of measures or to a reaction.

The measures or reactions can then be triggered when the slip present at the converter clutch (for example, the amount of the difference between the input and output rpms of the converter or the clutch) exceeds the pregiven first threshold value for a pregiven time duration. In this way also, the situation can be attained that short-term fluctuations of the converter slip or clutch slip do not lead immediately to a fault announcement.

In general, it is provided that the converter clutch can be actuated by means of a hydraulic adjusting pressure. The specific operating conditions at which the monitoring of the invention takes place can, in this case, be then present when the hydraulic adjusting pressure exceeds a third threshold value. Here, it can be assumed that a high clutch pressure effects an engagement of the clutch. This embodiment is in the same context as the embodiment already mentioned wherein the converter clutch is driven to adjust a slight slip. In this way also, a defect of the converter clutch can be detected wherein the converter clutch still correctly completely engages but the converter clutch permits an impermissibly high slip in the transition to the disengaged state.

The first, second or third above-mentioned threshold value can either be fixedly pregiven or be provided in dependence upon the operating parameters which represent or influence the operating state of the converter clutch. It can be especially provided that the first, second or third threshold value is pregiven by means of characteristic lines or characteristic fields in dependence upon the operating parameters which represent or influence the operating state of the converter clutch. Such operating parameters can be the state and/or the temperature of the converter clutch.

As already mentioned, another embodiment of the invention is directed to a clutch which can interrupt the frictional connection between the motor of the vehicle and the transmission by control of the clutch in the sense of disengaging the clutch. This can be a clutch actuable directly by the driver by means of which the motor of the vehicle is decoupled from the transmission during transmission switchover operations. The specific operating conditions in which the monitoring of the invention takes place are present when the clutch is driven in the sense of a complete engagement.

After ending the clutch operation, the clutch defines a rigid connection between the motor and the drive train. Toward the end of its service life, the pressing pressure of the clutch slowly deteriorates so that the maximum torques transmitted by the clutch decrease. In this phase, a slip occurs when the clutch is engaged, that is, after completing the clutch operation.

In an advantageous configuration of this embodiment, it is therefore provided that the specific operating conditions are then present when the output torque of the motor vehicle and/or at least a motor control variable exceeds a pregiven fourth threshold value. This motor control variable influences the output torque and/or represents the same. Here, especially the quantity to be injected and/or the motor load can be considered.

Existing clutch wear first becomes manifest for the transmission of high clutch torques via an increased slip. The detection of this slip for a closed clutch some time after the end of the clutch operation therefore permits the driver to be timely informed that the clutch should be exchanged before the clutch actually becomes inoperable. For this purpose, measures can be initiated in dependence upon the comparison result according to the invention. Triggering a fault display is part of initiating these measures.

Furthermore, and in response to the comparison result according to the invention, a modification of the control of the vehicle motor can be initiated in the sense of reducing the maximum output torque of the vehicle motor. This permits the remaining service life of the clutch to be extended because the clutch will then only transmit reduced torques.

The first threshold value is advantageously pregiven in dependence upon the instantaneously adjusted transmission ratio.

BRIEF DESCRIPTION OF THE DRAWINGS

The invention will now be described with reference to the drawings wherein:

FIG. 4 is a block diagram of a system for monitoring a clutch without a hydrodynamic converter connected in parallel therewith and with the system including a monitoring unit;

DESCRIPTION OF THE PREFERRED EMBODIMENTS OF THE INVENTION

Figure 1:
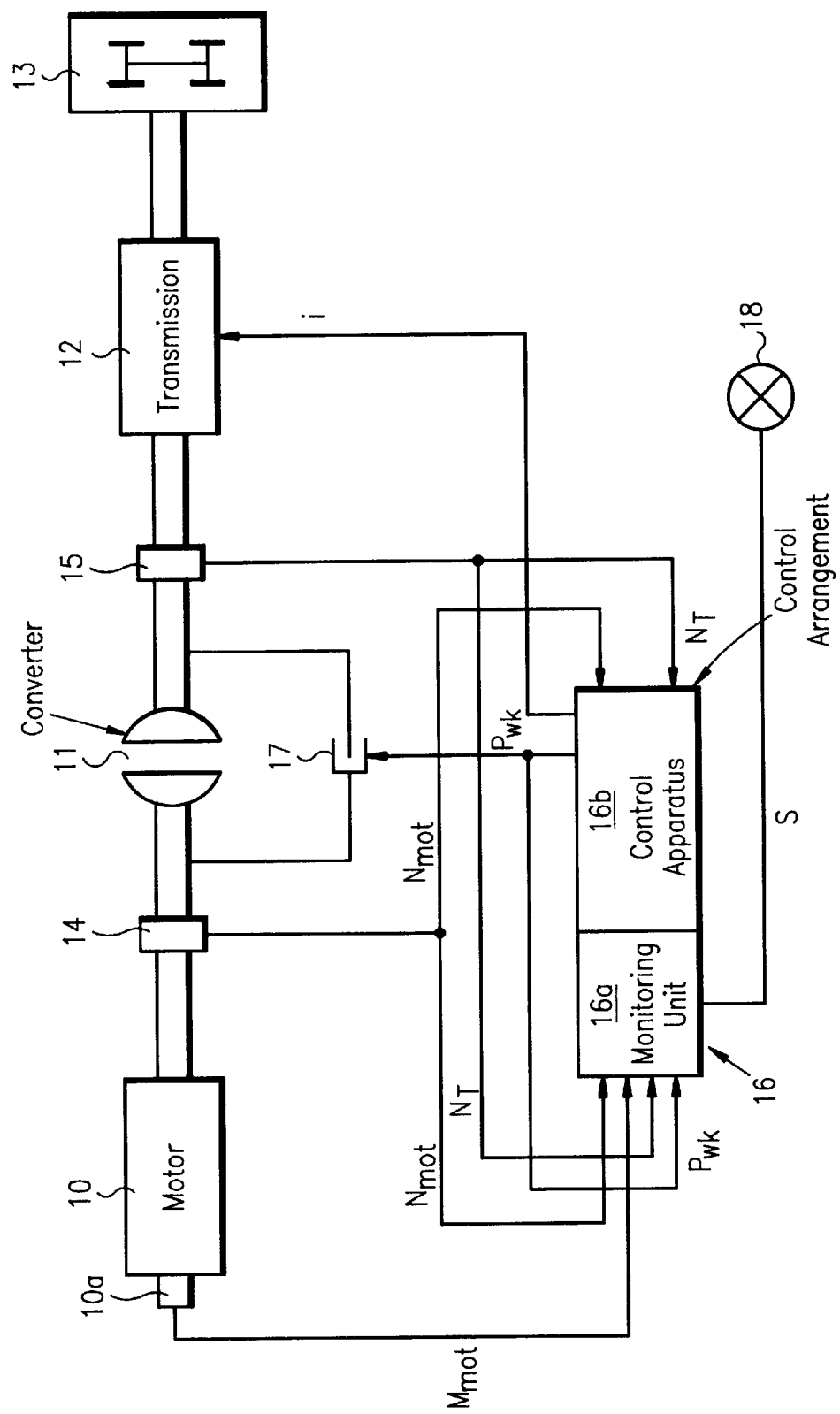
FIG. 1 is a block diagram showing a system for monitoring a clutch in the context of a hydrodynamic converter with the system including a monitoring unit.

In FIG. 1, reference numeral 10 identifies the motor of the vehicle. The motor is controlled by the motor control apparatus 10a. The output shaft of the motor 10 is connected to the input of the hydrodynamic converter 11. The output of the converter 11 leads via a transmission 12 (for example, an automatic transmission) to the wheels 13. If required, the output of the converter can also, if required, be transmitted via a differential transmission (not shown). The converter 11 can be bridged mechanically by a converter bridging clutch 17. For this purpose, the converter clutch 17 is charged with a specific converter clutch pressure via the control apparatus 16b of the control arrangement 16.

A drive signal $P_{wk}$ is outputted by the control apparatus 16b and corresponds to a converter clutch pressure to be adjusted. For determining the drive signal $P_{wk}$, the pump rpm and turbine rpm (input rpm and output rpm of the converter 11) $N_{mot}$ and $N_T$ are supplied, inter alia, to the control arrangement 16. The pump rpm and turbine rpm are detected by the sensors 14 and 15, respectively. The drive signal can, in a manner known per se, inter alia, be determined in dependence upon motor operating data (for example, motor torque, which is present in the motor control apparatus 10a) and by the instantaneous converter slip $(N_{mot}-N_T)$. The drive signal can be so configured that only a complete engagement or complete disengagement of the clutch 17 is possible (the drive signal has the values "open" and "closed") or a converter drive can take place wherein the clutch slip or converter slip is controlled to a specific value in a manner known per se. In the last-mentioned case, the drive signal $P_{wk}$ can be an analog or a clocked signal (for example a pulsewidth modulated signal). Furthermore, the control apparatus to control the converter clutch 17 is generally combined with the transmission control apparatus which controls the transmission ratio i of the automatic transmission 12.

What is essential for the invention is the configuration of the monitoring unit 16a. This unit and the control apparatus 16b conjointly define a combined unit (control arrangement 16). The following are supplied to the monitoring unit 16a: the motor torque $M_{mot}$ from the motor control apparatus 10a, the motor rpm $M_{mot}$ (which is detected by the sensor 14 and is present in the motor control apparatus 10a), the turbine rpm $N_T$ detected by the rpm sensor 15 and the drive signal $P_{wk}$. The monitoring unit 16a can form the signal S to drive the display device 18 for indicating a fault.

The sensor 14 detects the input rpm $N_{mot}$ of the converter 11 and the sensor 15 detects the output rpm $N_T$ of the converter. The monitoring device 16a forms a value as the difference $|N_{mot}-N_T|$ of the input rpm $N_{mot}$ and the output rpm $N_T$. Measures are initiated when the difference $|N_{mot}-N_T|$ exceeds the pregiven first threshold value S1 for a pregiven time duration.

Figure 2:
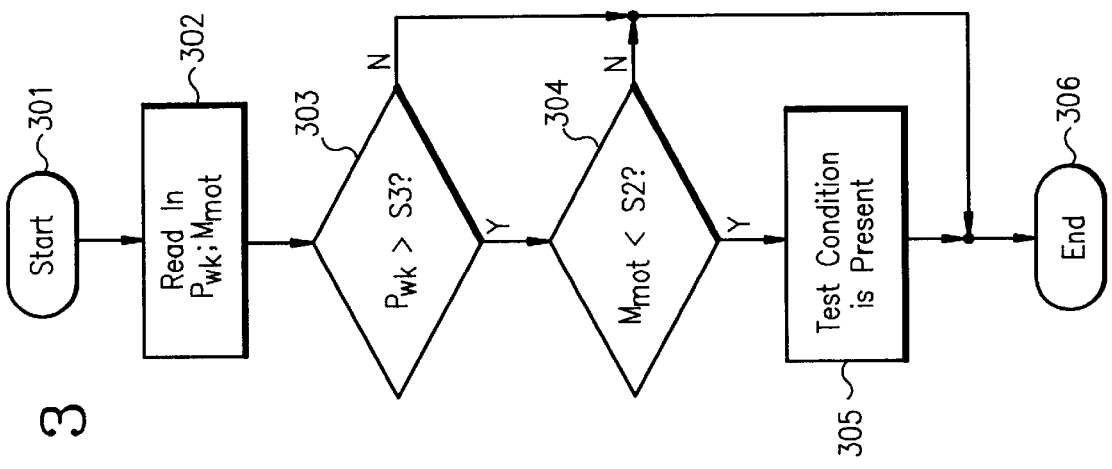
FIG. 2 is a flowchart showing the operation of the monitoring unit of the embodiment of FIG. 1.

FIG. 2 shows the operation of the monitoring unit 16a of FIG. 1. After the start step 201, the motor torque $N_{mot}$, the motor rpm $N_{mot}$, the turbine rpm $N_T$ and the drive signal $P_{wk}$ are read in in step 202. In step 203, a determination is made as to whether a specific test condition is present. The determination of the presence of the test condition is explained in greater detail with respect to FIG. 3. If the test condition is not present, then the program moves directly to the end step 206. If the test condition is present, then, in step 204, the amount of the clutch slip or converter slip $|N_{mot}-N_T|$ is compared to the threshold value S1. If the value $|N_{mot}-N_T|$ drops below the threshold value S1, then the program moves to the end step 206; otherwise, the signal S is formed in step 205, if required, after filtering. This signal S is formed in order to indicate a fault by means of the display device 18. After the end step 206, the passthrough shown in FIG. 2 is started again.

Figure 3:
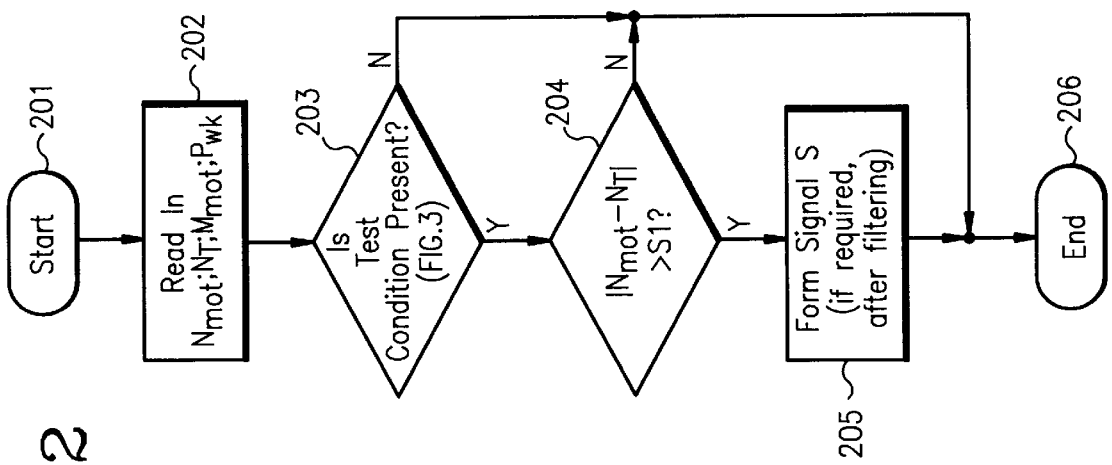
FIG. 3 shows a second flowchart for determining the pressure of a test condition with respect to the program shown in FIG. 2.

After the start step 301 shown in FIG. 3, the torque $M_{mot}$ and the drive signal $P_{wk}$ are read in in step 302. In step 303, a check is made as to whether the drive signal $P_{wk}$ exceeds a (relatively large) threshold value S3 (here, it is assumed that a large clutch pressure engages the converter clutch). If this is the case, that is, the clutch is engaged, then the program moves to step 304. If this is not the case (drive signal $P_{wk}$ drops below the relatively large threshold value S3), this means that the clutch can be disengaged, that is, a (slight) slip can be present for a correctly operating clutch. In this case, the program goes directly to step 306.

The background of the inquiry 303 comprises that there are three clutch states, namely:
(1) clutch completely engaged;
(2) clutch completely disengaged; and,
(3) clutch is somewhat disengaged for controlling to a pregiven slip.

Whereas in clutch state (2), no check is made, a check according to the invention can take place in state (1) provided the condition determined in step 304 is present. In state (3), for a defective clutch, the clutch adjusting pressure $P_{wk}$ continuously increases in order to control to the pregiven slip. This pressure $P_{wk}$ increases until it exceeds the threshold S3 whereupon one of the two test conditions (steps 303 and 304) is satisfied.

In the next step 304, the motor torque $M_{mot}$ is compared to a relatively low threshold value S2. If the motor torque is greater than threshold S2, this means that the input torque of the converter is so high that a relatively high slip can be caused by the converter. In this case, the function of the converter clutch can hardly be checked as to an impermissible slip.

However, if the motor torque is sufficiently low, this means that a relatively low converter slip can be expected. In this case, an evaluation (step 204) of the converter slip or clutch slip can take place to check the function of the converter clutch as to an impermissible slip. This is characterized by step 305. After the end step 306, the runthrough shown in FIG. 3 is started anew.

Exemplary values for the thresholds S1, S2 and S3 are as follows:
S1≈20 rpm
S2≈100 Nm; and,
S3≈5 bar,
wherein rpm corresponds to revolutions per minute and Nm corresponds to newton-meters.

In FIG. 4, reference numeral 410 identifies the motor of the vehicle and motor control apparatus 410a controls the operation thereof. The output shaft of the motor 410 is connected to the input of the clutch 417 and the output of the clutch is connected via a transmission 412 to the wheels 413 of the vehicle. The clutch 417 can, for example, be disengaged manually utilizing a clutch pedal to completely interrupt the flow of power to the transmission or the clutch can be disengaged electrically to also completely interrupt the flow of power. In the embodiment of FIG. 1, the interruption of the flow of power to the transmission could never be complete because the hydraulic converter is in parallel with the clutch.

The transmission 412 can, for example, be a conventional manual transmission and the output of the clutch 417 can also be connected, if required, via a differential transmission (not shown) to the wheels 413.

In the embodiment shown, the clutch known per se is actuated via the clutch pedal 421 actuated by the driver. This actuation K can take place also via a clutch actuator (not shown). This clutch actuator is charged directly by the driver or in the context of an automated manual transmission via a control apparatus.

What is essential for the invention is the configuration of the monitoring unit 416a which can advantageously be a component of the motor control 410a. The following are supplied to the monitoring unit 416a: the motor torque $M_{mot}$ from the motor control apparatus 410a, the motor rpm $N_{mot}$ (which is detected by sensor 414 or is present in the motor control apparatus 410a) and the transmission output rpm $N_{ab}$ detected by the rpm sensor 420. The monitoring unit 416a can drive the display device 418 to show excessive clutch wear by forming the signal S. The signal S, which is formed by the monitoring unit 416a, is also transmitted to the motor control 410a whereby the already mentioned reduction of the maximum motor torque is obtained.

Figure 5:
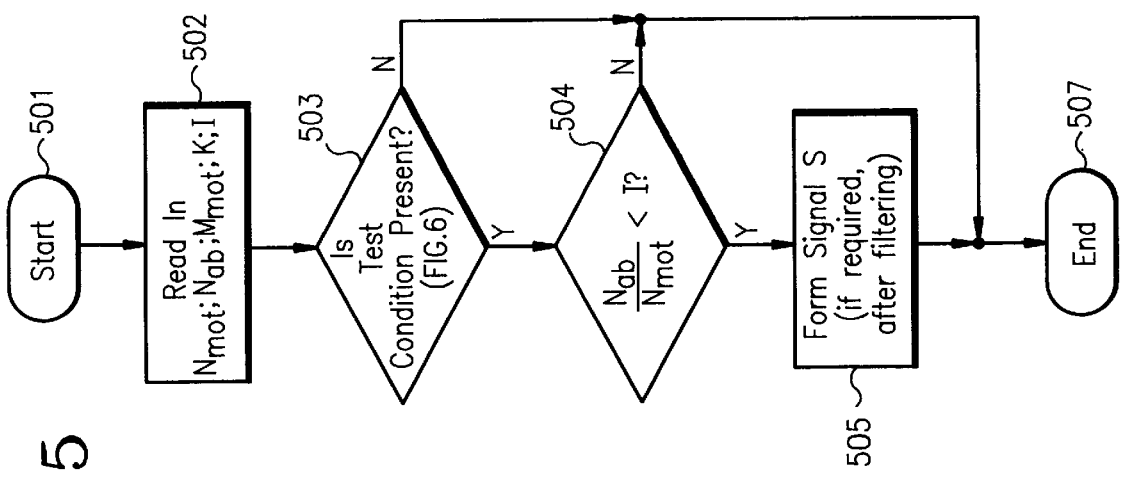
FIG. 5 is a flowchart showing the operation of the monitoring unit of the embodiment of FIG. 4; and, FIG. 6 is a flowchart for determining the presence of a test condition with respect to the program shown in FIG. 5.

FIG. 5 shows the operation of the monitoring unit 416a. After the start step 501, the motor torque $M_{mot}$, the motor rpm $N_{mot}$, the transmission output rpm $N_{ab}$, the clutch drive K and the actual transmission ratio I are all read in in step 502. In step 503, a determination is made as to whether a specific test condition is present. The determination of the presence of the test condition is explained in greater detail with respect to FIG. 6. If the text condition is not present, then the program goes directly to the end step 507.

If the test condition is present, then, in step 504, the ratio $N_{ab}/N_{mot}$ of the transmission output rpm to the motor rpm is compared to the instantaneous transmission ratio I. If the ratio $N_{ab}/N_{mot}$ does not exceed the value I, then the program goes to end step 507; otherwise, in step 505, the signal S is formed after filtering (as may be required) in order to display excessive clutch wear via the display device 418, that is, to reduce the maximum motor torque. After the end step 507, the program runthrough shown in FIG. 5 is started anew.

Figure 6:
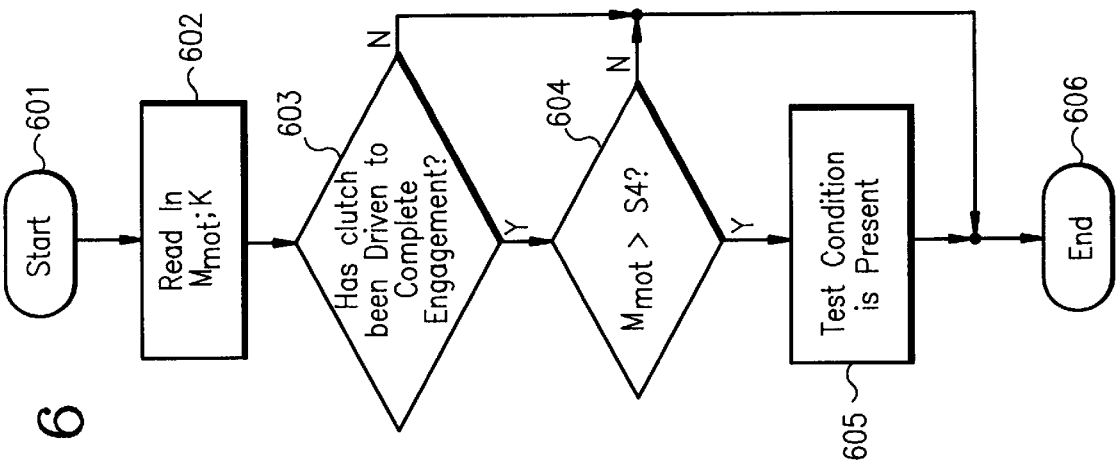

To determine whether a test condition is present, after start step 601 shown in FIG. 6, the motor torque $M_{mot}$ and the clutch drive K are read in in step 602. In step 603, a check is made as to whether the clutch drive K is such that the clutch is completely engaged. If, in step 604, it is determined that a relatively high motor torque is present (threshold value S4), then, in step 605, a determination is made that the test condition is present.

It is understood that the foregoing description is that of the preferred embodiments of the invention and that various changes and modifications may be made thereto without departing from the spirit and scope of the invention as defined in the appended claims.

What is claimed is:

1. A system for monitoring a clutch with respect to impermissible slip due to defecting clutch, the clutch being arranged between a motor of a vehicle and a transmission thereof, the system comprising:

sensor means for determining operating variables associated with at least one of said motor, said clutch and said transmission;

a monitoring device operatively connected to said sensor means;

said monitoring device including: value forming means for forming a value from said operating variables representing the slip present in said clutch; and, comparison means for comparing said value to a pregiven first threshold value when said clutch is driven to completely engage said clutch and for forming a signal when said value exceeds said pregiven first threshold value;

a converter mounted between said motor and said transmission;

said clutch being a converter bridging clutch connected so as to bridge said converter;

control means for driving said clutch to adjust said clutch to a desired slip and said specific operating conditions being present when said clutch is driven to completely engage said clutch; and, a fault display device for displaying said impermissible slip; and, wherein measures are initiated measures in dependence upon said signal; and, said measures are initiated by driving said display device.

2. The system of claim 1, wherein a first one of said operating variables is the output torque ($M_{mot}$) of said motor; and, said comparison means being adapted to compare said output torque ($M_{mot}$) to a pregiven second threshold value (S2) and said specific operating conditions being present when said output torque ($M_{mot}$) drops below said pregiven second threshold value (S2).

3. The system of claim 1, wherein the comparison result is filtered and said measures are initiated in dependence upon the filtered result.

4. The system of claim 3, wherein said sensor means includes a first sensor for detecting the input rpm ($N_{mot}$) of the converter and a second sensor for detecting the output rpm ($N_T$) of said converter; said value forming means forming said value as the difference ($|N_{mot}-N_T|$) of said input rpm ($N_{mot}$) and said output rpm ($N_T$); and, said initiating means initiating said measures when said difference ($|N_{mot}-N_T|$) exceeds said pregiven first threshold value (S1) for a pregiven time duration.

5. The system of claim 1, further comprising control means for actuating said clutch via a hydraulic adjusting pressure $P_{wk}$; and, said comparison means being adapted to compare said hydraulic adjusting pressure ($P_{wk}$) to a third threshold value (S3) whereby said specific operating conditions are present when said hydraulic adjusting pressure ($P_{wk}$) exceeds said third threshold value (S3).

6. The system of claim 5, wherein said threshold values are dependent upon operating parameters which represent the operating state of said converter bridging clutch.

7. The system of claim 5, wherein said threshold values are pregiven by characteristic lines or characteristic fields in dependence upon operating parameters which represent the operating state of said converter bridging clutch.

8. The system of claim 7, wherein said operating parameters include at least one of the state of said converter bridging clutch and the temperature of said converter bridging clutch.

9. A system for monitoring a clutch with respect to impermissible slip due to defecting clutch, the clutch being arranged between a motor of a vehicle and a transmission thereof, the system comprising:

sensor means for determining operating variables associated with at least one of said motor, said clutch and said transmission;

a monitoring device operatively connected to said sensor means;

said monitoring device including: value forming means for forming a value from said operating variables representing the slip present in said clutch; and, comparison means for comparing said value to a pregiven first threshold value when said clutch is driven to completely engage said clutch and for forming a signal when said value exceeds said pregiven first threshold value;

clutch actuation means for driving said clutch for disengaging said clutch to interrupt power flow between said motor and said transmission;

said specific operating conditions being present when said clutch is driven to completely engage; and, a fault display device; and, measures being initiated in dependence upon said signal; and, said measures are initiated by driving said fault display device.

10. The system of claim 9, wherein said specific operating conditions are present when the output torque ($M_{mot}$) of said motor and/or at least a motor operating variable, which influences and/or represents said output torque ($M_{mot}$), exceeds a pregiven fourth threshold value (S4).

11. The system of claim 9, wherein said first threshold value is the value ($N_{ab}/N_{mot}$) and is pregiven in dependence upon the instantaneously adjusted transmission ratio (I).

* * * * *

UNITED STATES PATENT AND TRADEMARK OFFICE
CERTIFICATE OF CORRECTION

| | | |
|---|---|---|
| PATENT NO. | : 5,982,280 | Page 1 of 1 |
| DATED | : November 9, 1999 | |
| INVENTOR(S) | : Wilhelm Fahrbach, Thomas Rueping, Marcel Hachmeister and Ralf Klewin | |

It is certified that error appears in the above-identified patent and that said Letters Patent is hereby corrected as shown below:

Title Page, under [54]: before "MONITORING" insert -- SYSTEM FOR --.

Column 1,
Line 1: before "MONITORING" insert -- SYSTEM FOR --.

Column 7,
Line 42: delete "measures" (second occurrence).

Signed and Sealed this

Seventh Day of August, 2001

*Attest:*

NICHOLAS P. GODICI
*Attesting Officer*     Acting Director of the United States Patent and Trademark Office